(12) United States Patent
Kumagai et al.

(10) Patent No.: US 7,982,665 B2
(45) Date of Patent: Jul. 19, 2011

(54) GPS-INSTALLED ALL-AZIMUTH CAMERA AND SPATIAL DATA COLLECTING DEVICE

(75) Inventors: Kaoru Kumagai, Itabashi-ku (JP); Fumio Ohtomo, Itabashi-ku (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 204 days.

(21) Appl. No.: 12/462,004

(22) Filed: Jul. 28, 2009

(65) Prior Publication Data
US 2010/0033371 A1 Feb. 11, 2010

(30) Foreign Application Priority Data
Aug. 7, 2008 (JP) ................................. 2008-204326

(51) Int. Cl.
*G01S 13/00* (2006.01)
(52) U.S. Cl. ........................................ 342/179; 342/175
(58) Field of Classification Search .................. 342/179, 342/175
See application file for complete search history.

(56) References Cited

U.S. PATENT DOCUMENTS
| | | | |
|---|---|---|---|
| 5,988,862 A | 11/1999 | Kacyra et al. ................. | 364/578 |
| 6,452,543 B1 * | 9/2002 | Tseng et al. ............. | 342/357.36 |
| 2002/0042675 A1 * | 4/2002 | Takahashi ...................... | 701/213 |
| 2002/0180641 A1 * | 12/2002 | Fink et al. ...................... | 342/464 |
| 2003/0152145 A1 * | 8/2003 | Kawakita ................. | 375/240.12 |

FOREIGN PATENT DOCUMENTS
| | | |
|---|---|---|
| JP | 2000-194983 | 7/2000 |
| JP | 2002-031528 | 1/2002 |
| JP | 2003-139533 | 5/2003 |
| JP | 2004-030011 | 1/2004 |
| JP | 2004-151043 | 5/2004 |
| JP | 2006-119591 | 5/2006 |

OTHER PUBLICATIONS

Materials of the 15th Three dimensional engineering symposium (16-Pages), with English translation of relevant parts.
Proc. Of SPIE, vol. 5419; pp. 26-35; Steven E. Fredrickson et al.; "Application of the Mini AERCam Free Flyer for Orbital Inspection"; XP040184844.
European communication dated Oct. 12, 2009.

* cited by examiner

*Primary Examiner* — Thomas H Tarcza
*Assistant Examiner* — Harry Liu
(74) *Attorney, Agent, or Firm* — Nields, Lemack & Frame, LLC

(57) ABSTRACT

The present invention provides a GPS-installed all-azimuth camera, comprising at least a pair of GPS antennas (29*a* and 29*b*) disposed on up and down in parallel to each other, a plurality of cameras (28*a*-28*f*) which are disposed on a plane running in parallel to the GPS antennas and are capable of obtaining images in all azimuths, and a case (27) for accommodating the cameras and the GPS antennas, wherein a reference position of the GPS antennas is concurred with an image reference position of the cameras.

13 Claims, 5 Drawing Sheets

HEADING DIRECTION

GPS-INSTALLED ALL-AZIMUTH CAMERA AND SPATIAL DATA COLLECTING DEVICE

BACKGROUND OF THE INVENTION

The present invention relates to a GPS-installed all-azimuth camera and to a spatial data collecting device. The GPS-installed all-azimuth camera and spatial data collecting device picks up an image while moving between constructions or buildings in urban space and so on, further detects a position where the image is picked up, and collects the spatial data based on a picked up image data thus picked up and on a position data thus detected in order to form a three-dimensional model of constructions and buildings in urban space and so on.

In recent years, there has been remarkable progress in a technique of an all-out positioning system such as a GPS (Global Positioning System). As a result, even when a device with relatively low cost is used, a position measurement can be performed with high accuracy to an extent of several tens of centimeters.

The GPS as described above is installed on a moving object such as a vehicle, and cameras or a laser surveying device (laser scanner) are also installed. Thereby, it has been developed a data collecting system for collecting a three-dimensional data of constructions and buildings in urban space and for collecting images, and this data collecting system is made good use of the preparation of a map data to be used for car navigation and other purposes (JP-A-2006-119591 and JP-A-2000-194983).

In the system as described above, the map data is prepared in such manner that the three-dimensional data of the buildings obtained by the system is reflected on a map prepared in the past by using methods such as a manual positioning or a fitting based on an arithmetic processing and so on. In the preparation of map data described above, not much high accuracy is required.

However, it is difficult to obtain the data with high accuracy in the conventional system. Therefore, it is not suitable for a survey to compare the map data prepared in the past with the current and actual building in urban space or for a survey to match the map data-prepared in the past with the actual building.

In case where such surveys as described above are conducted, it is necessary to obtain the three-dimensional data of the building in urban space and so on with higher accuracy. Also, it is necessary to accurately identify positions of camera or laser scanner to obtain the data in themselves for obtaining the three-dimensional data with higher accuracy.

JP-A-2006-119591 discloses a spatial data collecting device of conventional type. Referring to FIG. 7, a description will be given now on approximate arrangement of the device described above.

In FIG. 7, reference numeral 1 denotes a vehicle, numeral 2 denotes a video camera, numeral 3 denotes a GPS, numeral 4 denotes a vehicle velocity sensor, numeral 5 denotes an azimuth sensor, and numeral 6 denotes a storage device.

The vehicle 1 moves while images are taken by the video camera 2, and a video data picked up in association with the moving of the vehicle 1 is obtained, and a position data of the video camera 2 is obtained by the GPS 3 at the same time as the image pickup. Further, an image pickup direction of the video camera 2 is determined by the azimuth sensor 5.

Based on a position information of the video camera 2 as obtained by the GPS 3 and an azimuth (image pickup direction) as obtained by the azimuth sensor 5, a relative position information between the object to be detected as detected from the video data and the video camera 2 is calculated. Based on the relative position information thus calculated and the positioning information as given above, the position information of the object to be detected is generated.

A data collecting device of conventional type has a structure where the GPS 3 is installed on the video camera 2. A reference position of the GPS 3 and a center of the image picked by the video camera 2 are disposed at such positions as separated from each other by a certain predetermined distance. For instance, in case where the vehicle 1 is tilted, a position deviation occurs in horizontal direction between the video camera 2 and the GPS 3, and the measuring position of the GPS 3 does not necessarily reflect an accurate position of the center of the image picked by the video camera 2. Accordingly, it is difficult to obtain the three-dimensional data of a building in urban space and so on with high accuracy.

As shown in FIG. 8, a road surface place-along-the-route photography vehicle 11 is shown in JP-A-2000-194983. The road surface place-along-the-route photography vehicle 11 comprises a film camera 12, a distance measuring device 13, a steering angle detecting device 14, a GPS 15, a displacement sensor 16, a central control device 17, and a gyro 18. The road surface and place-along-the-route are filmed by the film camera 12. The video information as taken on the road and surface place-along-the-route are associated with a position information of the place to be filmed as obtained by the GPS 15 and/or a road surface information of the place to be filmed, and the data are stored and/or displayed.

Also, in JP-A-2000-194983, the film camera 12 and the distance measuring device 13 are disposed at such positions as separated from the GPS 15. In case where the direction of the road surface place-along-the-route photography vehicle 11 is changed or in case where the road surface place-along-the-route photography vehicle 11 is tilted, the deviation may occur between the position information detected by the GPS 15 and the positions of the film camera 12 and the distance measuring device 13. As a result, error may occur when the image data taken by the film camera 12 is associated with the position information.

Therefore, also in JP-A-2000-194983, it is difficult to obtain the three-dimensional data of a building in urban space and so on with high accuracy.

SUMMARY OF THE INVENTION

It is an object of the present invention is to make a position information measured by GPS reflect accurately a position of the center of the image picked up by an image pickup device, to associate the image data with the position information with high accuracy, and to make it possible to obtain accurate three-dimensional data of the building in urban space and so on.

To attain the above object, the present invention provides a GPS-installed all-azimuth camera, comprising at least a pair of GPS antennas disposed on up and down in parallel to each other, a plurality of cameras which are disposed on a plane running in parallel to the GPS antennas and are capable of obtaining images in all azimuths, and a case for accommodating the cameras and the GPS antennas, wherein a reference position of the GPS antennas is concurred with an image reference position of the cameras. Also, the present invention provides the GPS-installed all-azimuth camera a described above, wherein the pair of GPS antennas are installed on up and down with a predetermined distance away, and wherein the cameras are disposed between the GPS antennas. Further, the present invention provides the GPS-installed all-azimuth camera a described above, wherein the case is designed in spherical shape. Also, the present invention provides the GPS-installed all-azimuth camera a described above, wherein the cameras are disposed also in zenith direction, which an image reference position of the camera concur with reference position of the GPS antennas.

Further, the present invention provides a spatial data collecting device, comprising a GPS-installed all-azimuth camera according to claim 1, an azimuth sensor, and an arithmetic processing device, wherein the arithmetic processing device calculates a coordinate data at an image pickup point based on signals from the GPS antennas and calculates three-dimensional coordinates of an object to be measured in the picked-up image based on the coordinate data at the image pickup point as obtained, on the picked-up image and on a signal from the azimuth sensor. Also, the present invention provides the spatial data collecting device as described above, comprising a storage unit, wherein a picked-up image is associated with the obtained three-dimensional coordinates and is stored in the storage unit. Further, the present invention provides the spatial data collecting device as described above, comprising an inertial measurement unit, wherein in case where a position information cannot be obtained by the GPS antennas, the position information is supplemented by the inertial measurement unit.

The present invention provides a GPS-installed all-azimuth camera, comprising at least a pair of GPS antennas disposed on up and down in parallel to each other, a plurality of cameras which are disposed on a plane running in parallel to the GPS antennas and are capable of obtaining images in all azimuths, and a case for accommodating the cameras and the GPS antennas, wherein a reference position of the GPS antennas is concurred with an image reference position of the cameras. As a result, also in case where the moving object to support the GPS-installed all-azimuth camera changes a direction or the moving object is tilted, no deviation occurs between the reference point of the GPS antenna and the reference point of the image to be picked up by the camera, and there is no need to perform a compensation with regard to the two reference points.

Also, the present invention provides a spatial data collecting device, comprising a GPS-installed all-azimuth camera according to claim 1, an azimuth sensor, and an arithmetic processing device, wherein the arithmetic processing device calculates a coordinate data at an image pickup point based on signals from the GPS antennas and calculates three-dimensional coordinates of an object to be measured in the picked-up image based on the coordinate data at the image pickup point as obtained, on the picked-up image, and on a signal from the azimuth sensor. As a result, it is possible to immediately calculate the three-dimensional coordinates without performing the compensation for making the reference position of the GPS antenna concur with the image reference position of the camera. Also, a burden on the arithmetic processing device is reduced, and it is possible to collect the data with high accuracy.

Further, the present invention provides the spatial data collecting device as described above, further comprising an inertial measurement unit, wherein in case where position information cannot be obtained by the GPS antennas, the position information is supplemented by the inertial measurement unit. As a result, even under a circumstance where the electric waves from artificial satellite cannot be received, the data can be collected. There is no lacking of data, and there is no need to compensate the lacking of data by other measuring method, and data can be collected with high efficiency.

DETAILED DESCRIPTION OF THE PREFERRED EMBODIMENT

A description will be given below on the best mode for carrying out the present invention by referring to the attached drawings.

Figure 1:
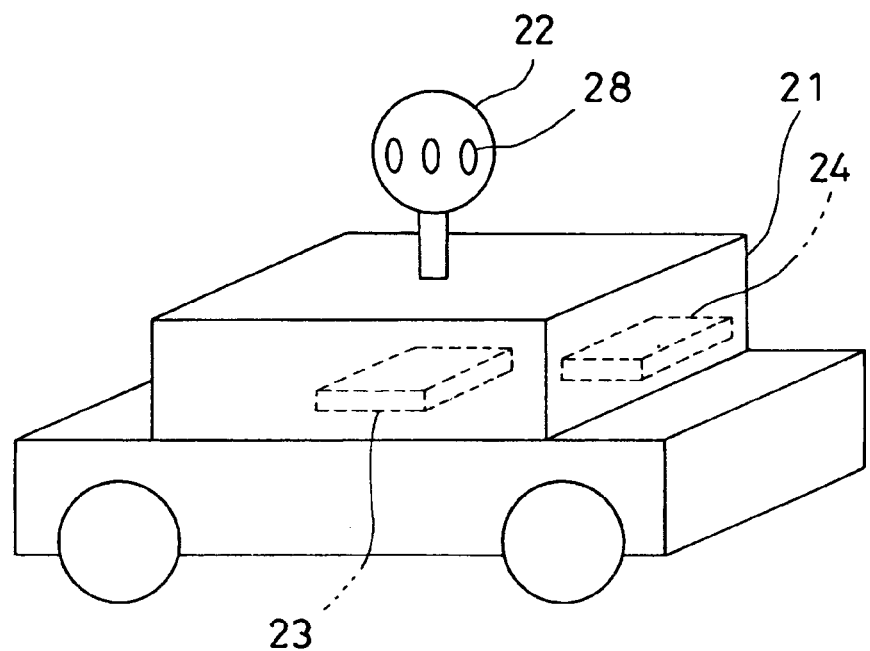
FIG. 1 is a schematical perspective view of a spatial data collecting device according to an embodiment of the present invention.

As shown in FIG. 1, a GPS-installed all-azimuth camera 22 is installed on a moving object 21 such as an automobile. The GPS-installed all-azimuth camera 22 is installed at a position where the camera has all azimuths in its visual field, e.g. at a ceiling of the moving object 21. An arithmetic processing device 23 and an inertial measurement unit (IMU) 24 are mounted on the moving object 21.

Figure 2:
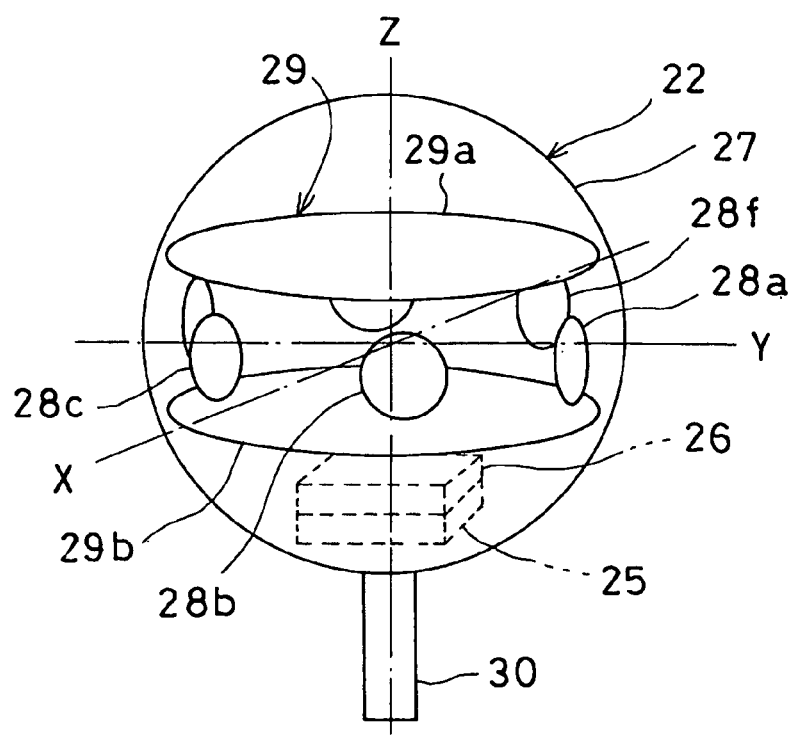
FIG. 2 is a schematical perspective view of a GPS-installed all-azimuth camera according to an embodiment of the present invention.
Figure 3:
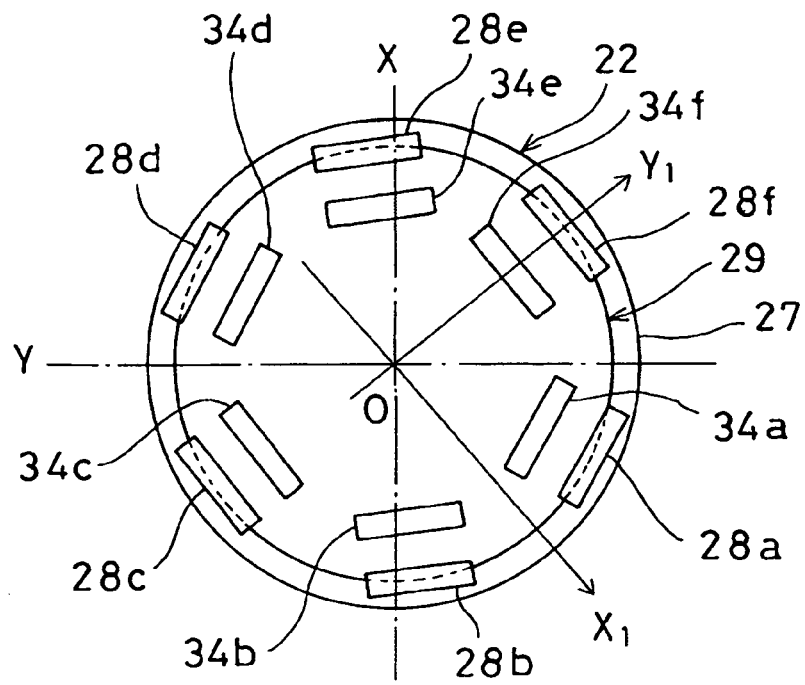
FIG. 3 is a schematical cross-sectional plan view of the GPS-installed all-azimuth camera.
Figure 4:
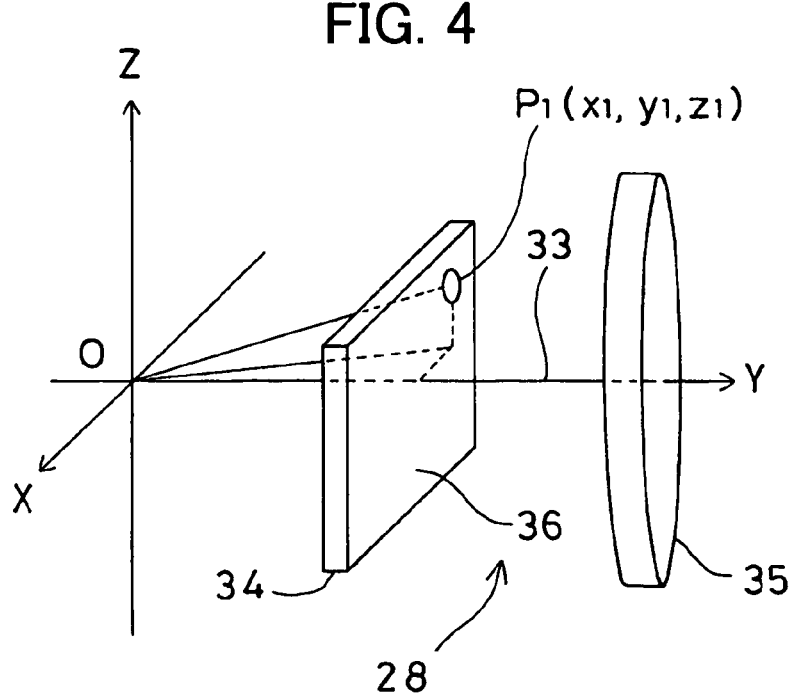
FIG. 4 is a drawing to explain a relation between a camera used in the GPS-installed all-azimuth camera and the center point O.

From FIG. 2 to FIG. 4 shows an approximate arrangement of the GPS-installed all-azimuth camera 22 used in the present embodiment of the invention. A description will be given now on the GPS-installed all-azimuth camera 22.

A plurality of cameras, e.g. 6 cameras 28a-28f, a pair of GPS antennas 29a and 29b disposed in parallel to each other in horizontal direction, a tilt sensor 25, and the azimuth sensor 26 are incorporated in a spherical case 27. The case 27 is mounted via a vertical pillar 30, and the case 27 is designed in watertight structure, and the GPS-installed all-azimuth camera 22 has waterproof structure. The GPS antennas 29a and 29b fulfill the functions as a pair of GPS antennas 29.

Optical axes 33a-33f (see FIG. 3) of optical system of each of the cameras 28a-28f are on the same horizontal plane. The optical axes 33a-33f cross each other at a single point, preferably at the center point O of the case 27. Further, the optical axes 33a-33f are disposed at equal angle to each other with the center point O as the center—that is, the optical axes are disposed in radial direction each separated at an angle of 60°.

Because each of the cameras 28a-28f has the same structure, a description will be given below by regarding them as a single camera 28.

The camera 28 has a photodetection element 34 and an objective lens 35 which forms has the optical system as given above. The photodetection element 34 is an aggregate of pixels such as CCD, CMOS, etc., and the camera 28 is so designed that a position of a pixel to be detected on a photodetection plane 36 can be identified.

Further, the camera 28 is arranged that a field angle can be identified from the position of the pixel. For instance, in FIG. 4, if it is assumed that the center point O is an origin of three-dimensional coordinates, that a position of the photodetection plane 36 on the optical axis 33 is y1, that a position of a pixel P1 in horizontal direction is x1, and that a position of a pixel P1 in vertical direction is z1, then a horizontal angle with respect to the optical axis 33 can be determined as $\tan^{-1} x1/y1$, and a vertical angle with respect to the optical axis 33 can be determined as $\tan^{-1} z1/y1$. Therefore, if the azimuth of the optical axis 33 is known, the azimuth of an arbitrary pixel in the photodetection element 34 can be identified. That is, the center point O serves as a reference position of the image.

Each of the GPS antennas 29a and 29b is designed in form of a disk and are disposed on upper side and on lower side with the cameras 28a-28f between the GPS antennas 29a and 29b. The GPS antennas 29a and 29b can receive electric waves (with frequencies L1 and L2) from artificial satellite. By a position measurement with two wavelengths, the measurement can be made with high accuracy. The reference point of each of the GPS antennas 29a and 29b is set at the center point O, and a position measured when electric waves are received by the GPS antennas 29a and 29b is a position related to the center point O. A plurality of pairs of GPS antennas may be provided. For instance, two pairs of antennas, i.e. two on upper side and two on lower side, may be provided with the cameras 28a-28f between the GPS antennas 29a and 29b. Also, the camera 28 may be disposed at a zenith of the case 27. Also in this case, the image reference position should concur with the reference point of each of the GPS antennas 29a and 29b.

Figure 5:
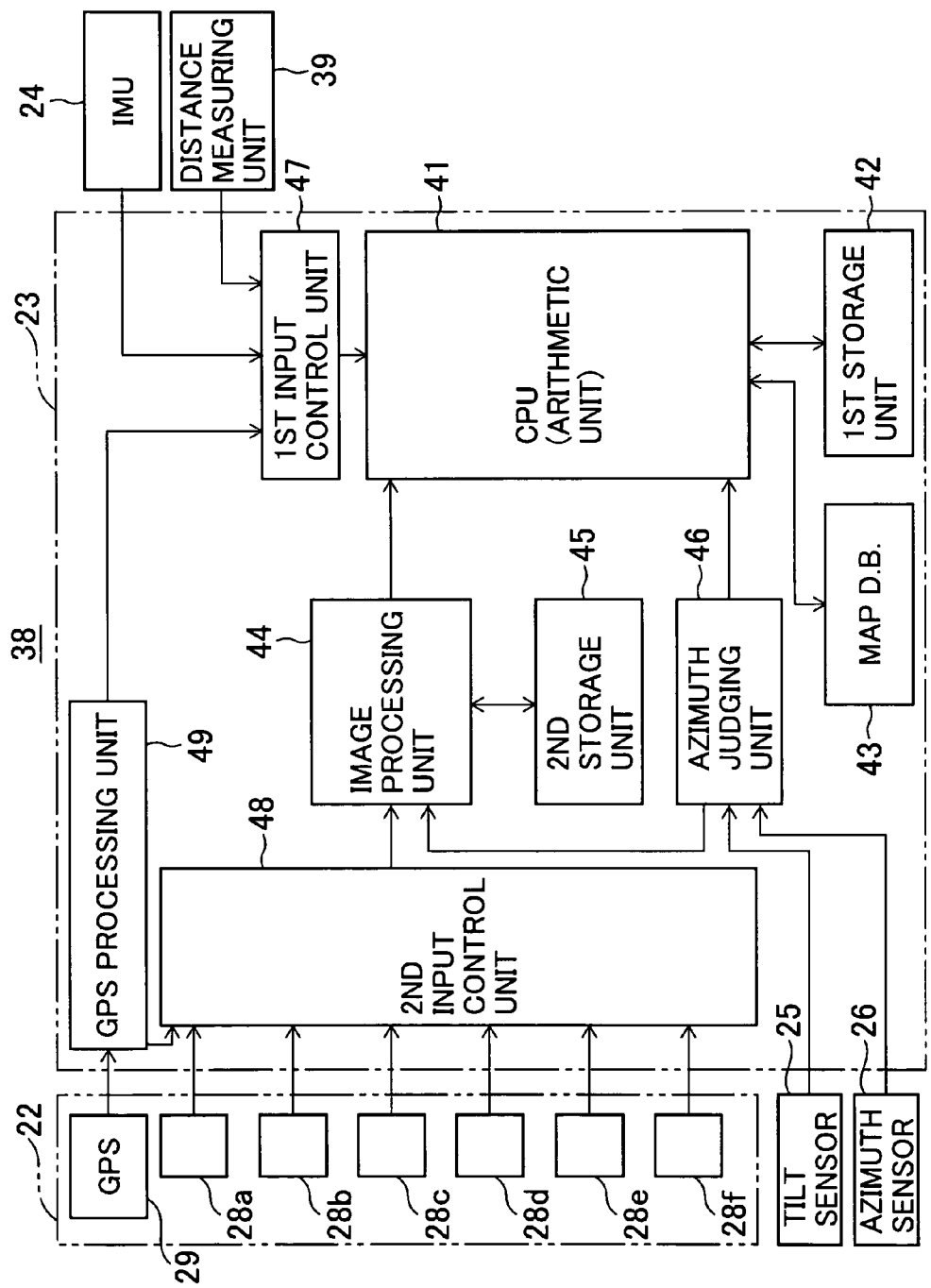
FIG. 5 is a schematical block diagram of the spatial data collecting device according to an embodiment of the present invention.

Next, referring to FIG. 5, a description will be given on an approximate arrangement of the spatial data collecting device 38 of the present embodiment.

The spatial data collecting device 38 primarily comprises the GPS-installed all-azimuth camera 22, the tilt sensor 25, the azimuth sensor 26, the arithmetic processing device 23, the inertial measurement device 24, and a distance measuring unit 39.

The arithmetic processing device 23 comprises an arithmetic unit 41, a first storage unit 42, a map data storage unit 43, an image processing unit 44, a second storage unit 45, and an azimuth judging unit 46. Signals from the inertial measurement device 24, the distance measuring unit 39, and the GPS antennas 29a and 29b are inputted to the arithmetic unit 41 via a GPS processing unit 49 and a first input control unit 47. Images in all azimuths are picked up by the cameras 28a-28f. In the image pickup mode by the cameras 28a-28f, each camera may continuously obtain moving images, or each camera may obtain still images with a predetermined time interval. The image data thus obtained are inputted to the image processing unit 44 as image digital signals via a second input control unit 48.

The second input control unit 48 outputs the image signals sent from the cameras 28a-28f as signals of series associated with GPS time. For instance, camera numbers to identify the cameras 28a-28f are set as a, b, . . . , and f respectively, and an image signal from the camera 28a is set as an "a" image signal, an image signal from the camera 28b is set as a "b" image signal, . . . , and an image signal from the camera 28f is set as an "f" image signal, and the signals are outputted in time series.

At the image processing unit 44, constructions and buildings are extracted from the image data inputted via the second input control unit 48 and further, characteristic points (orientation points) are extracted after executing the constructions and the buildings by an edge processing and so on. After an image processing, the image data are associated with each of the camera numbers, and the image data are stored in the second storage unit 45 in time series.

The azimuth judging unit 46 judges the azimuth in image pickup direction of each of the cameras 28a-28f. An azimuth detection signal is inputted at least from the azimuth sensor 26 of the tilt sensor 25 and the azimuth sensor 26 and is sent to the image processing unit 44. Further, the camera number is inputted at the image processing unit 44.

The azimuth detected by the azimuth sensor 26 concurs with a direction of optical axis of the optical system of a camera, which serves as a reference among the cameras 28a-28f, e.g. the camera 28a. Therefore, if the camera number is identified, an azimuth (image pickup direction) of each of optical axes 33a-33f of the cameras 28a-28f is determined.

Various types of programs are stored in the first storage unit 42. These programs include: a coordinate position calculating program for calculating a position of the center point O in a global coordinate system (absolute plane coordinates) based on signals from the GPS antennas 29, a sequence program for measuring a distance to a construction and a building by the distance measuring unit 39, a three-dimensional coordinates calculating program for calculating the three-dimensional coordinates of the construction and the building based on the image data from the image processing unit 44, on the signal from the GPS processing unit 49, on the distance measurement data from the distance measuring unit 39, and on the azimuth data from the azimuth judging unit 46, a comparing and calculating program for calculating a calibration value by comparing the obtained three-dimensional coordinates with map data stored in the map data storage unit 43, and a data processing program for performing the data processing such as attaching of the image data of the construction and the building based on the obtained three-dimensional coordinates, and other programs.

In case where the moving object 21 passes through a place such as a tunnel where electric waves of artificial satellite do not reach, the position measurement cannot be carried out by the GPS antennas 29. In the case described above, a result of the position measurement by the inertial measurement unit 24 is adopted from the last position which, can be measured by the GPS antennas 29, and the position measured by the inertial measurement unit 24 is adopted as the position of the center point O. Also, in case where it becomes possible to receive the signal from the GPS antennas 29 again, the result of position measurement based on the signal from the GPS antennas 29 is adopted. Further, in case where an error occurs between the result of position measurement based on the signal from the GPS antennas 29 and a position measured by the inertial measurement unit 24, the error is corrected according to the result of the position measurement based on the signal from the GPS antennas 29.

The signal from the GPS processing unit 49, the distance measurement data on the construction and the building from the distance measuring unit 39, and detection signal from the inertial measurement unit 24 are inputted to the arithmetic unit 41 via the first input control unit 47. Also, image signal from the image processing unit 44 and azimuth signal from the azimuth judging unit 46 are inputted to the arithmetic unit 41.

The arithmetic unit 41 calculates the present position of the center point O of the GPS-installed all-azimuth camera 22 (a position in the global coordinate system) at real time based on signal and coordinate position from the GPS antennas 29 and the GPS processing unit 49, associates the signal and the azimuth from the azimuth judging unit 46 with the present position and the picked-up image and stores in the first storage unit 42.

With respect to the image obtained between two points, the arithmetic unit 41 calculates a distance between two points obtained based on the signals at each point from the GPS antennas 29 and from the GPS processing unit 49. Further, a distance between each point and the image pickup object is calculated based on the distance between the two points and the azimuth of the image pickup object as seen from each point, and the three-dimensional coordinates of the image pickup object are calculated. Further, the image data of the image pickup object are associated with three-dimensional absolute coordinates, and the result is stored in the first storage unit 42.

Now, referring to FIG. 6, a description will be given below on a data collecting operation by the spatial data collecting device 38 as described above.

While the moving object 21 is moving in data collection area, images of all azimuths are obtained by the cameras 28a-28f. If the cameras 28a-28f are video cameras, moving pictures are obtained at a rate of 30 frames/sec by each individual camera. Before the execution of data collecting by the cameras 28a-28f, each camera is adjusted in advance by an initial setting procedure such as calibration.

Each of the GPS antennas 29a and 29b constantly receives electric waves (with two frequencies) from the artificial satellite 51, and a global coordinate position, i.e. a position of the center point O, is calculated by the arithmetic processing device 23 based on the received electric waves.

As described above, the reference positions of the GPS antennas 29a and 29b and the image reference positions as taken by the cameras 28a-28f are both at the center point O. Accordingly, the result of position measurement based on the signal received from the GPS antennas 29 (hereinafter referred as "GPS position information") is the reference position of the image. Both in case where the direction of the vehicle is changed and in case where the vehicle is tilted, no deviation occurs between the reference position of the GPS antennas 29 and the reference position of the image. Thus, there is no need to perform a compensation, and high accuracy is assured.

In case where the GPS position information is associated with the image data and further, the distance is measured by the distance measuring unit 39, the result is associated with the distance measurement data and is stored in the first storage unit 42. The present position of the center point O is determined by the inertial measurement unit 24, and the result is obtained as an IMU position information. The IMU position information is compensated based on the GPS position information periodically or at real time. Also, the IMU position information is used when the GPS position information cannot be obtained.

Figure 6:
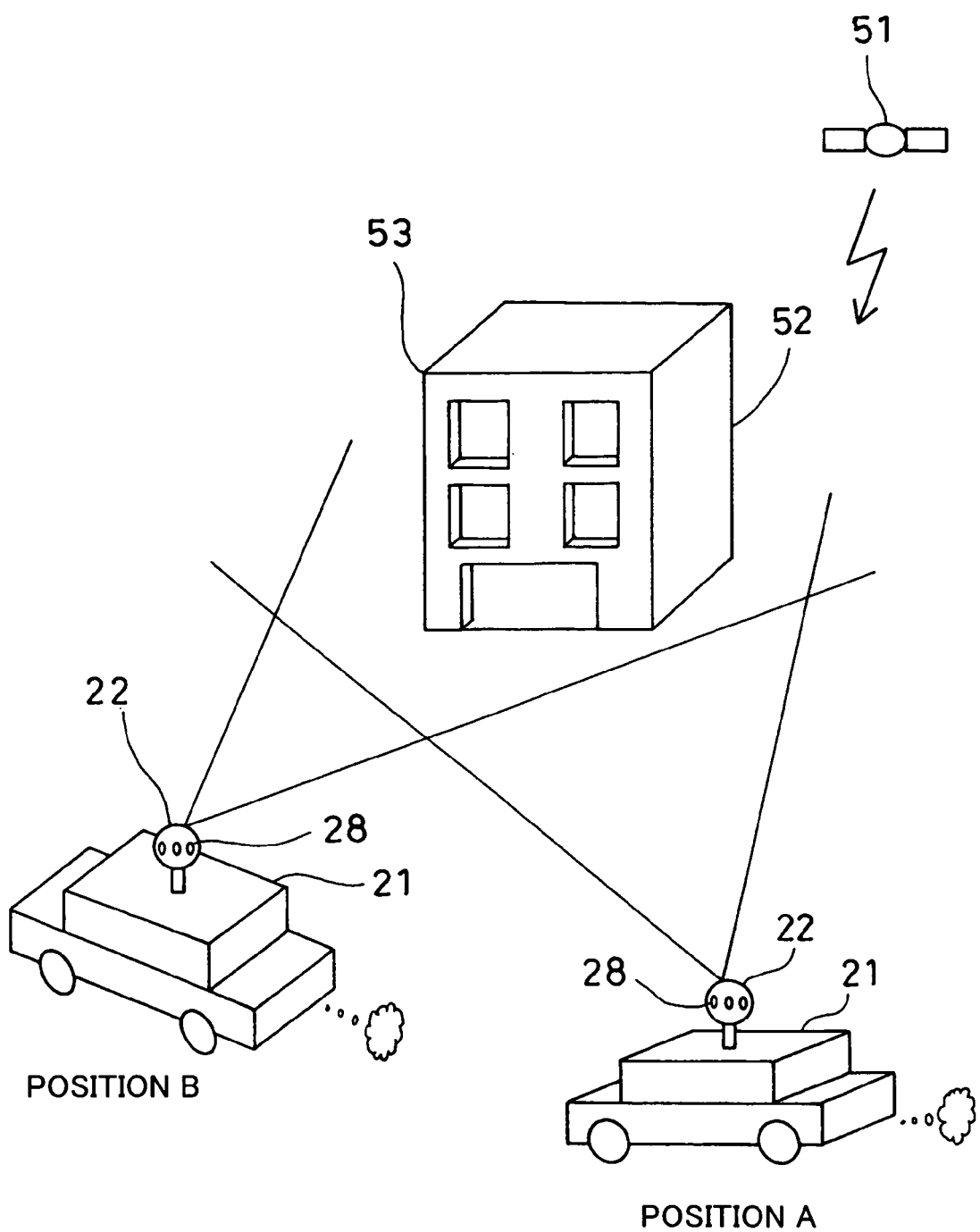
FIG. 6 is a drawing to explain an operation in an embodiment of the present invention.
Figure 7:
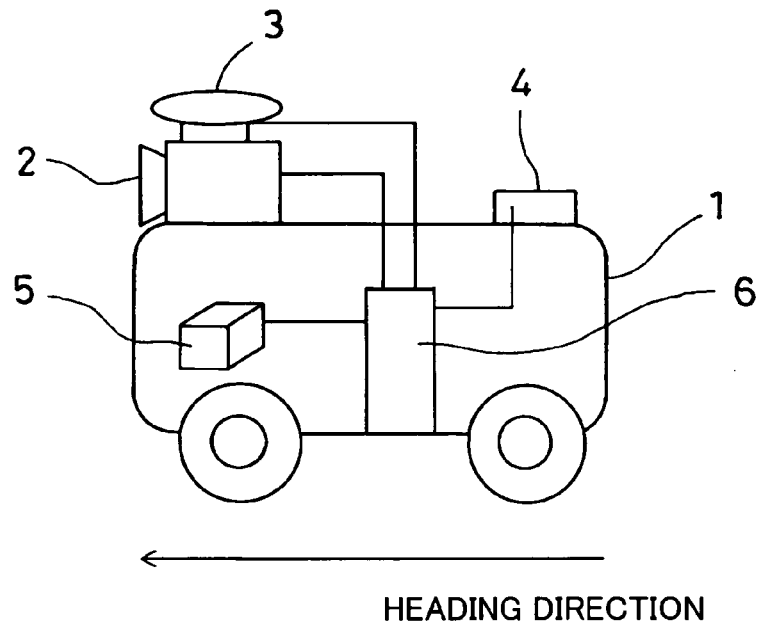
FIG. 7 is a drawing to explain a conventional example.
Figure 8:
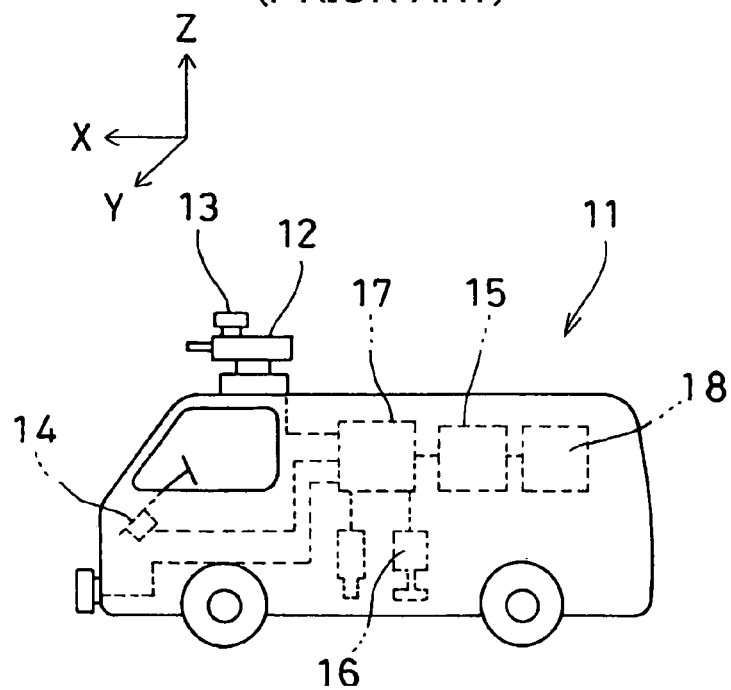
FIG. 8 is a drawing to explain another type of conventional example.

Referring to FIG. 6, a description will be given on a case where the image data and the three-dimensional coordinate data of a building 52 are collected. Also, a description will be given below on a case where the distance measurement data cannot be obtained by the distance measuring unit 39.

During the process where the moving object 21 moves from a position A to a position B, GPS position information is constantly obtained by the GPS antennas 29, and images in all azimuths are continuously obtained by the cameras 28a-28f.

The GPS position information is obtained at the position A. Among the images as obtained at the position A, in case where the building 52 is included in the image picked up by the camera 28a, for instance, a building image data 52a of the building 52 is extracted from the image of the camera 28a obtained from the position A to the position B. Further, image matching is performed between frames, adjacent to each other in terms of time, of the continuous images, and tracking is carried out between the images.

To simplify the procedure of the image matching, edge processing of the image may be performed to extract characteristic points on the building image data 52a, and matching may be performed between the characteristic points. Further, because there is no big change in the building image data 52a between the frames, the image matching can be carried out in easy manner. In case where the image matching is not performed successfully between the frames, image matching is performed with an image obtained by an adjacent camera, e.g. the camera 28b.

At a time when the moving object 21 reaches the position B. GPS position information of the position B is obtained, and the building image data 52a' is extracted from the image obtained at the position B. The extraction of the building image data 52a' can be easily carried out by image tracking using continuous images form the position A.

Orientation is performed on the building image data 52a at the position A and on the building image data 52a at the position B. An azimuth (a horizontal angle) of a center of the picked-up image at the position A, i.e. an azimuth of optical axis of the camera 28a, is obtained when the azimuth detected by the azimuth sensor 26 and the camera 28 as used are identified. A vertical angle is obtained by a tilt angle detected by the tilt sensor 25. Similarly, a horizontal angle and a vertical angle are determined on the picked-up image at the position B.

A plurality of orientation points are selected from the building image data 52a and the building image data 52a'. For instance, a corner of the building 52 is selected as the orientation point 53. When the orientation point 53 is selected, a horizontal angle and a vertical angle of the orientation point 53 at each of the position A and the position B can be obtained from a position of a pixel P1 in the photodetection element 34, which detects the light from the orientation point 53 (see FIG. 4).

A distance between the position A and the position B can be obtained by the calculation based on the GPS position information at two points. Further, a distance to the orientation point 53 can be obtained from the position A and the position B. Based on the horizontal angle and the vertical angle thus obtained, the three-dimensional coordinates of the orientation point 53 can be determined. Because the reference points of the cameras 28a-28f are the same as the reference points of the GPS antennas 29, even when the horizontal angle and the vertical angle of the camera 28 change, no deviation occurs between the two reference points, and there is no need to perform the compensation.

By obtaining the three-dimensional coordinates on a predetermined number of points of the building 52, the three-dimensional coordinate data of the building 52 can be obtained. Further, by associating the image data of the structure 52 with the three-dimensional coordinate data, the image can be used as the map data and can be compared with the existing map data. Then, it is possible to perform calibration of the existing map data and to attach the image data on the existing map data.

With respect to the acquisition of the image data and the three-dimensional coordinate data, three-dimensional data in the global coordinate system can be obtained not only on building, but also on various types of the installed objects such as roadside trees, edge stones, telephone poles, traffic lights, and so on together with the image.

Next, in case where distance is measured on the building 52 by the distance measuring unit 39, distances to the building 52 from the position A and the position B respectively can be obtained. Based on distance measuring direction, on the results of distance measurement, and on the GPS position information at the two points, the three-dimensional coordinates of the building 52 can be determined.

The GPS antennas 29a and 29b may be superposed, and are regarded as a single circular base plate in appearance, the cameras 28a-28f may be disposed around the base plate, and the reference positions of the images of the cameras 28a-28f may concur with the reference positions of the GPS antennas 29a and 29b. In the case described above, the case to accommodate the cameras 28a-29f and the GPS antennas 29a and 29b is formed in a disk-like shape.

The invention claimed is:

1. A GPS-installed all-azimuth camera, comprising at least a pair of GPS antennas disposed on up and down in parallel to each other and, a plurality of cameras which are disposed on a plane running in parallel to said GPS antennas and are capable of obtaining images in all azimuths, and a case for accommodating said cameras and said GPS antennas, wherein a reference position of said GPS antennas is concurred with a image reference position of said cameras.

2. A GPS-installed all-azimuth camera according to claim 1, wherein said pair of GPS antennas are installed on up and down with a predetermined distance away, and wherein said cameras are disposed between said GPS antennas.

3. A GPS-installed all-azimuth camera according to claim 1, wherein said case is designed in spherical shape.

4. A GPS-installed all-azimuth camera according to claim 1 or 3, wherein optical axes of said plurality of cameras concur with each other at the center of said case.

5. A GPS-installed all-azimuth camera according to claim 3, wherein the cameras are disposed also in zenith direction, which an image reference position of said cameras concur with an reference position of said GPS antennas.

6. A GPS-installed all-azimuth camera according to claim 2, wherein a plurality of pairs of said GPS antennas are installed with said cameras between said GPS antennas.

7. A GPS-installed all-azimuth camera according to claim 1, wherein a plurality of GPS antennas are superposed and are designed as a single base plate and said plurality of cameras are disposed around said base plate.

8. A GPS-installed all-azimuth camera according to claim 7, wherein said case is designed in disk-like shape.

9. A spatial data collecting device, comprising a GPS-installed all-azimuth camera according to claim 1, an azimuth sensor, and an arithmetic processing device, wherein said arithmetic processing device calculates a coordinate data at an image pickup point based on signals from said GPS antennas and calculates three-dimensional coordinates of an object to be measured in the picked-up image based on the coordinate data at the image pickup point as obtained, on the picked-up image, and on a signal from said azimuth sensor.

10. A spatial data collecting device according to claim 9, further comprising a storage unit, wherein a picked-up image is associated with the obtained three-dimensional coordinates and is stored in said storage unit.

11. A spatial data collecting device according to claim 9, further comprising an inertial measurement unit, wherein in case where a position information cannot be obtained by said GPS antennas, the position information is supplemented by said inertial measurement unit.

12. A spatial data collecting device according to claim 9, wherein the azimuth detected by said azimuth sensor concurs with one of optical axes of said cameras.

13. A spatial data collecting device according to claim 11, wherein said arithmetic processing device compensates the position information determined by said inertial measurement unit based on the position information by said GPS antennas periodically or at real time.

\* \* \* \* \*